E. J. LOBDELL.
STEERING WHEEL.
APPLICATION FILED MAR. 29, 1917.
1,236,455.
Patented Aug. 14, 1917.
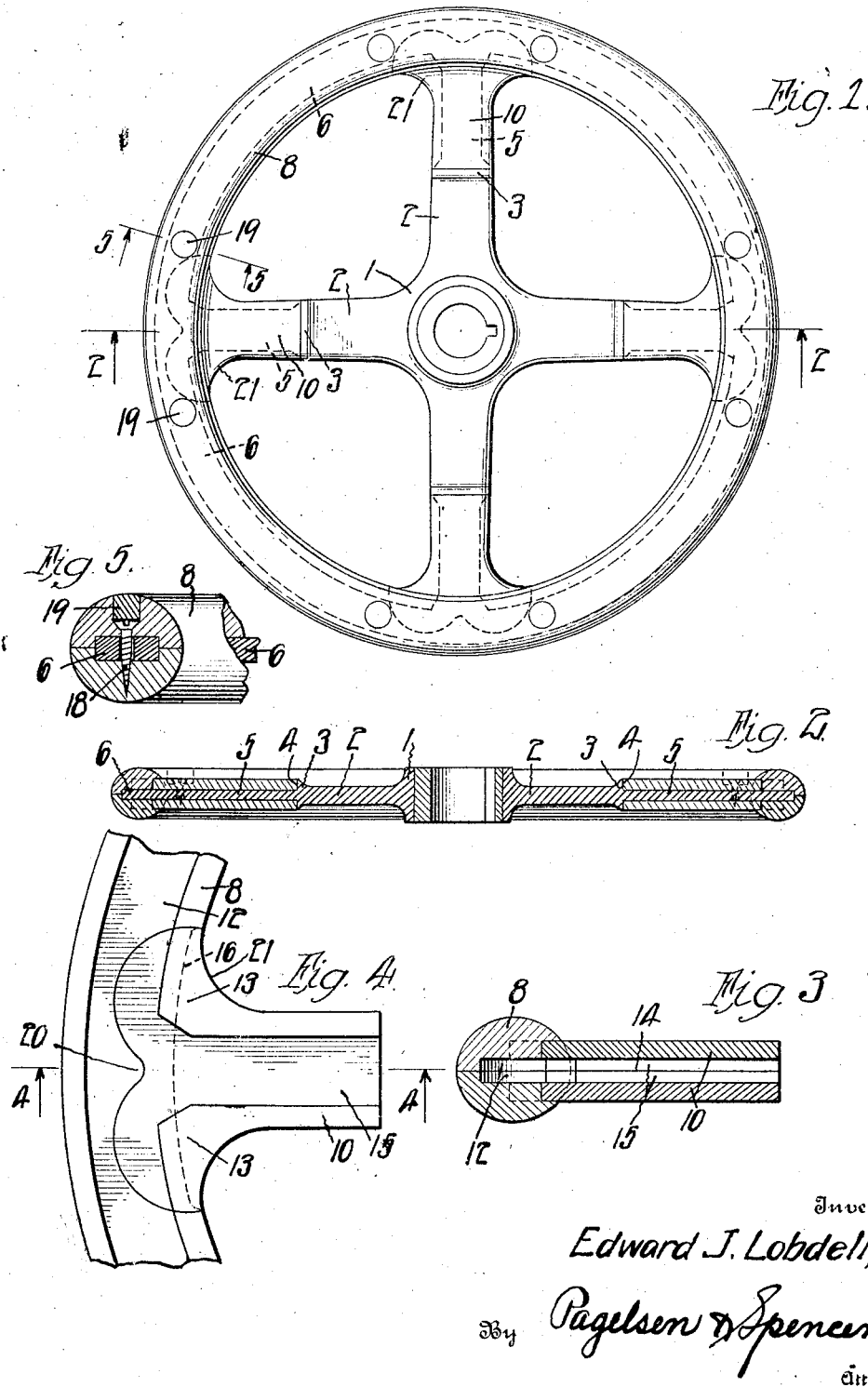
Inventor
Edward J. Lobdell,
By Pagelsen & Spencer
Attorneys

UNITED STATES PATENT OFFICE.

EDWARD J. LOBDELL, OF ONAWAY, MICHIGAN.

STEERING-WHEEL.

1,236,455.  Specification of Letters Patent.  Patented Aug. 14, 1917.

Application filed March 29, 1917. Serial No. 158,244.

*To all whom it may concern:*

Be it known that I, EDWARD J. LOBDELL, a citizen of the United States, and residing at Onaway, in the county of Presque Isle and State of Michigan, have invented a new and Improved Steering-Wheel, of which the following is a specification.

The present invention relates to steering and other hand wheels for vehicles and its object is to provide a wheel wherein the outer portions of the spokes or spider arms are incased in a protective wooden covering so that contact of the hand with the metal of the arms in the usual steering operations is avoided; to provide means whereby the joint between the spokes and the rim is substantially concealed; to provide a substantially unnoticeable joint between the ends of the wooden covering and the rim; to provide a joint between the wooden covering and the rim of considerably greater length longitudinally of the latter than the width of the covering at points some distance inwardly from the rim; to provide a joint between the covering and the rim of such nature as to afford a very large gluing area flatwise of the grain, and to in general produce a better and stronger wheel than has been possible heretofore. The invention will be more fully understood from the following description of a preferred embodiment, it being remembered that the shape and proportion of the parts may be widely changed.

In the drawings, Figure 1 is a plan view showing one embodiment of my invention. Fig. 2 is a section on the line 2—2 of Fig. 1. Fig. 3 is an enlarged fragmentary section on the same line, the metal reinforcing being removed. Fig. 4 is a fragmentary section on the line 4—4 of Fig. 3. Fig. 5 is a section on the line 5—5 of Fig. 1.

The central portion of the spider 1 may be of any suitable form and preferably includes four arms 2 at substantially right angles to one another. These arms preferably have shoulders 3 (the faces 4 of which lie in planes substantially perpendicular to the plane of the wheel), and from the latter extend outwardly in the form of reduced end portions 5 of substantially rectangular cross-section, both width and thickness of which are less than the corresponding dimension of the rest of the arms. At the outer ends the arms merge into circular reinforcing bar 6, also preferably of rectangular cross-section, by which they are joined to one another and to which they may be secured by welding.

The bar 6 is incased in a laminated wooden rim 8 the dividing surfaces of the laminæ of which (not shown) are preferably substantially concentric to the axis of the wheel; and the end portions 5 of the arms are likewise incased in wooden coverings 10. As best shown in Fig. 4, the rim is split or sawed through in its own central plane after its outer surface has been turned to the desired cross section. Each half is then again placed in the chuck of the turning lathe, and grooved along its plane surface, as indicated at 12, to conform to the shape of the corresponding half of the bar 6, after which two symmetrical grooves, one on each side of the center line of the corresponding arm, are cut therein by a suitable cutter rotating about axes through the points 13 near the inner surface of the rim. These circular grooves are deeper than the groove 12, and receive the corresponding half of the covering 10 which is split as shown at 14 (Fig. 3) in the plane of the common surface of the sections of the rim. The intersection of the covering 10 with the rim 8 being closed to the inner edge of the latter, as shown by the dashed line 16 in Fig. 4, it follows that the joint is substantially concealed. The halves of the covering 10 are then grooved at 15 to correspond to the corresponding half of the respective arm, after which the halves of the rim have their meeting faces coated with glue and are applied to the reinforcing bar 6 in an obvious manner. Screws 18 that have their heads countersunk in one half of the rim and pass through the reinforcing bar and into the other half, and plugs 19 for the screw holes complete the constructions.

The grain of the rim sections of course extends longitudinally of the rim whereas that of the covering 10 extends longitudinally of the corresponding arm, consequently the gluing surface, except that of the arcs of the circles about points 13, is flatwise of the grain, which develops a much greater holding power than would otherwise be secured. The arc-shaped surfaces of the rim form abutments through which stresses from the rim are transmitted to the arm sectors at points removed a considerable distance from the axis of the latter, and the projection 20 of the rim constitutes in effect a third abutment or key for transmitting tangential stresses from rim to spider. The direct engagement of the covering 10 with the faces 4 of the shoulders 3 simplifies the operation of assembling and affords a means for directly supporting the arm covering against radial inward thrusts. By finishing the surface of the covering along arcs 21, a more easy grip for the hands is secured.

The details of construction may be varied largely without departing from the spirit of the invention, for example, the cross section of the reinforcing and of the arms may be other than that shown, and the shape of the ends of the covering 10 may be changed. The device may of course be used for purposes other than the steering of vehicles, for example, it may constitute a control lever for elevators. I do not, therefore, wish to be limited except as indicated by the subjoined claims.

I claim:—

1. A steering wheel or the like comprising a wooden rim and a spider including a plurality of metal arms extending into the rim, and wooden coverings for the outer ends of said arms, said covering being interposed between the end portions of the arms and the rim, the material of the rim being continuous both above and below the several coverings.

2. A steering wheel or the like comprising a wooden rim and a spider including a plurality of metal arms extending into the rim, and wooden coverings for the outer ends of said arms, said coverings being interposed between the end portions of the arms and the rim on opposite sides of the central plane of the rim, and having their outer ends formed in a plurality of part-cylindrical surfaces the axes of which are parallel to the axis of the wheel, the rim having sockets shaped to conform to the outer ends of said coverings.

3. A steering wheel or the like comprising a wooden rim and a spider including a plurality of metal arms extending into the rim and wooden coverings for the outer ends of said arms, said coverings being interposed between the end portions of the arms and the rim on opposite sides of the central plane of the rim, and having their outer ends formed in a plurality of part-cylindrical surfaces the axes of which are parallel to the axis of the wheel, the rim having sockets shaped to conform to the outer ends of said coverings, the material of the rim being continuous both above and below the several coverings.

4. A steering wheel or the like comprising an internally reinforced wooden rim, a metal spider having arms joined to the reinforcement of the rim, said arms having shoulders some distance inwardly from the rim, and wooden coverings for the portions of said arms between the shoulders and the rim.

5. A steering wheel or the like comprising a wooden rim, a metal spider having arms extending into the rim, said arms having shoulders some distance inwardly from the rim, and wooden coverings for the portions of said arms between the shoulders and the rim.

6. A steering wheel or the like comprising a wooden rim and a spider including a plurality of metal arms extending into the rim, wooden coverings for the outer ends of the arms each of said wooden coverings having its outer end cut to form a plurality of part-cylindrical surfaces the axes of which are parallel to the axis of the wheel, the rim being shaped to correspond thereto, said coverings being glued to the rim.

7. A steering wheel or the like comprising a rim split centrally in the plane of the wheel, a spider having arms the extreme outer ends of which are received in the rim, coverings for the outer portions of said arms, said coverings also being split in the plane of the wheel, each section of the rim being mortised to receive the end of the corresponding section of the covering, the mortises each including a plurality of lobes.

8. A steering wheel or the like comprising a wooden rim, a metal spider having arms extending into the rim, wooden coverings for the outer ends of said arms, the outer ends of said coverings being interposed between the corresponding arm and the rim, said coverings being substantially T-shaped, the wood of the rim being continuous past the coverings on both sides of the central plane of the rim, and the coverings being glued to the rim.

9. A steering wheel or the like comprising a wooden rim, the grain of the wood extending longitudinally of the rim, a metal spider having arms extending into the rim, wooden coverings for the outer ends of said arms, the outer ends of said coverings being interposed between the corresponding arm and the rim, said coverings being substantially T-shaped, the grain of the wood coverings extending radially of the rim, the coverings and the rim being glued together.

10. In a steering wheel or the like comprising a wooden rim and a metal spider having arms extending into the rim, substantially T-shaped coverings for the outer ends of said arms, the bars of the T-shaped coverings being received in sockets cut into the rim from the inner surface thereof, whereby the material of said rim is rendered continuous past the coverings on both sides of the central plane of the rim.

11. A steering wheel or the like comprising a wooden rim split in its central plane, a metal spider having arms extending into the rim, wooden coverings for the ends of the arms also extending into the rims, portions of the sections of the rim being cut away adjacent the ends of the arms to form sockets of the same depth as the thickness of the wooden coverings, the coverings being glued in the sockets.

12. A steering wheel or the like comprising a wooden rim split in its central plane, a metal spider having arms extending into the rim, substantially T-shaped wooden coverings for the ends of the arms, said coverings also being split in the central plane of the rim, portions of the sections of the rim being cut away adjacent the ends of the arms to form sockets of the same depth as the thickness of the corresponding sections of the wooden coverings, the coverings being glued in the sockets and the several sections of the rim and coverings being glued together in the central plane of the rim.

13. In a steering wheel or the like comprising a wooden rim and a metal spider having arms extending into the rim, substantially T-shaped coverings for the outer ends of said arms, the faces of the coverings most remote from the stems each including two arc-shaped surfaces abutting against correspondingly shaped walls of sockets cut into the rim from the inner surface thereof, whereby the material of said rim is rendered continuous past the coverings and whereby a strong connection between the coverings and the rim is secured.

14. In a steering wheel or the like comprising a wooden rim and a metal spider having arms extending into the rim, substantially T-shaped coverings for the outer ends of said arms, the bars of the T-shaped coverings being received in sockets cut into the rim from the inner surface thereof, whereby the material of said rim is rendered continuous past the coverings on both sides of the central plane of the rim, the material of the stem of the coverings merging into the material of the bar thereof along curved surfaces located inside of the rim.

EDWARD J. LOBDELL.